Aug. 15, 1939.   C. C. HERSKIND   2,169,876
GRID CONTROL RECTIFIER
Filed July 1, 1938

Inventor:
Carl C. Herskind,
by Harry E. Dunham
His Attorney.

Patented Aug. 15, 1939

2,169,876

UNITED STATES PATENT OFFICE 2,169,876

GRID CONTROL RECTIFIER

Carl C. Herskind, Schenectady, N. Y., assignor to General Electric Company, a corporation of New York Application July 1, 1938, Serial No. 217,090

4 Claims. (Cl. 175—363)

My invention relates to control systems for and methods of operation of electric valve converting systems and more particularly to such systems operating to transfer energy from an alternating current circuit to a direct current circuit.

In electric valve converting systems operating between direct and alternating current circuits wherein control of the output is determined by controlling the moments of ignition of the valves of the system, it is known that the power factor of the apparatus is also reduced if this method of control is used materially to reduce the output of the electric valve converting system and often this power factor becomes low enough to be undesirable. In accordance with my invention I propose to control the power output of the rectifier so as to reduce materially the power output without obtaining the disadvantage of a relatively low power factor.

An object of my invention is to provide an improved electric valve converting system operating between alternating and direct current circuits.

Another object of my invention is to provide an improved control circuit for electric valve rectifying systems by means of which an improved power factor may be obtained.

Still another object of my invention is to provide an improved method of operation of an electric valve converting system so that lower output thereof may be obtained with a relatively satisfactory power factor.

In accordance with my invention I provide a control circuit for retarding the moments of ignition of the valves over a predetermined range and then subsequently introducing an interphase winding into the rectifying system and simultaneously readjusting the moments of ignition of the valves for a further decrease in the power output of the electric valve converting system.

Figure 1:
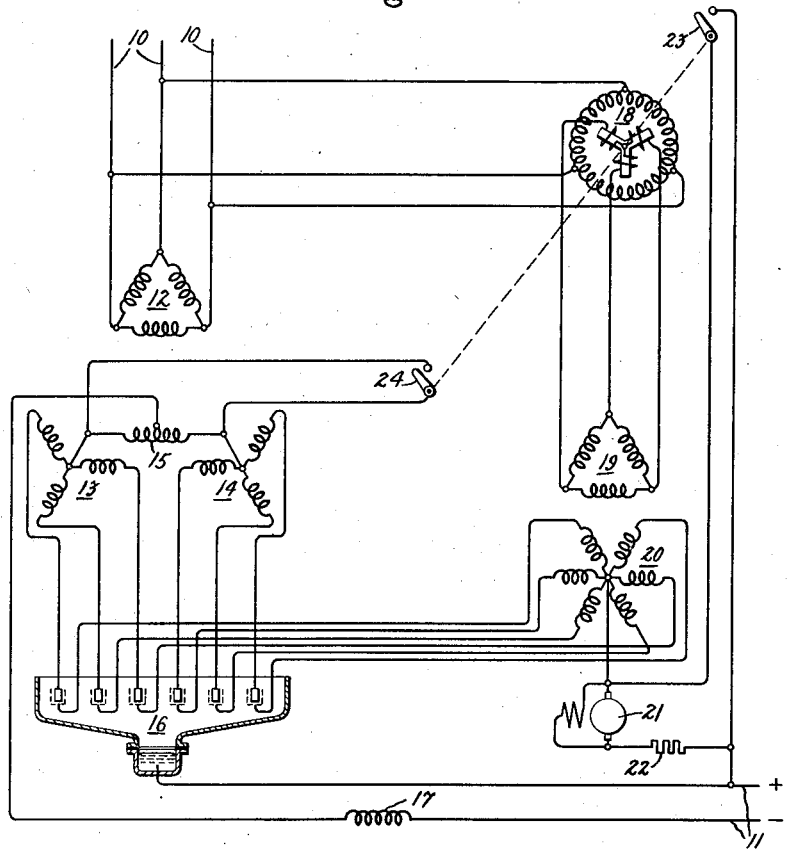

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawing in which Fig. 1 is a diagrammatic representation of an electric power converting apparatus embodying my invention, and Fig. 2 illustrates the method of operation and the operating characteristics of the system.

Referring now to the drawing, I have illustrated an electric valve converting apparatus for transmitting energy between an alternating current circuit 10 and a direct current circuit 11. This electric valve converting system may be any of the several types well known in the art, but I have illustrated by way of example an electric valve converting system which includes a primary winding 12 energized from the alternating current circuit 10, and a plurality of polyphase star-connected networks 13 and 14 the neutral points of which may be selectively interconnected by means of an inductive interphase winding 15. The outer extremities of the polyphase secondary networks 13 and 14 are connected to one side of the direct current circuit through a plurality of electric arc discharge paths which may be in the form of a single cathode multi-anode electric valve 16. Obviously, of course, these valves may be any of the type commonly utilized in the art although it is preferable to utilize those types having an anode and a cathode and a control electrode or starting electrode enclosed within an envelope containing an ionizable medium. The midpoint of the interphase inductive winding 15 is connected through a suitable smoothing reactor 17 to the other side of the direct current circuit 11.

In accordance with my invention a control circuit is provided for the electric valve group 16 and this includes a suitable phase shifting device 18 energized from the alternating current source 10 and which device supplies energy to a transformer having a primary winding 19 and a secondary winding 20. The various phases of the secondary winding 20 supply energy to the various control electrodes of the arc discharge paths of the electric valve means 16. The neutral point of this secondary winding 20 is connected through a source of biasing voltage 21 and a current limiting resistor 22 to the cathode of the valve means 16. The biasing voltage 21 may comprise, as illustrated, a direct current generator or it may be a rectifier of the contact type or any other source of direct current. A switch 23 is provided for short circuiting the biasing means 21. A short circuiting switch 24 is also provided for selectively cutting out the effect of the inductive interphase winding 15. Both these switches 23 and 24 are arranged to be operated simultaneously at a predetermined time by the control which includes the phase shifting means 18.

Figure 2:
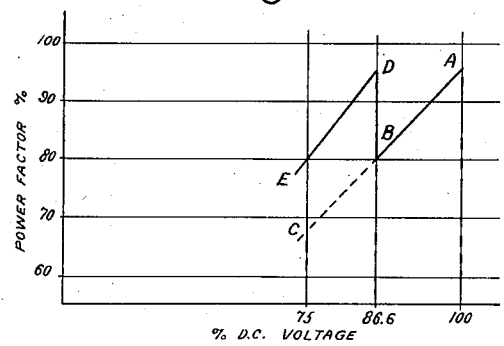

If the sole means for reducing the power output of an electric valve converting system is merely some means for progressively retarding the moments of ignition of the valve the power factor of the electric valve converting system will be relatively low as may be seen from the curve AC in Fig. 2. In accordance with my invention, however, the voltage of the electric valve converting means is reduced from full value at the point A on this curve to some value in the proximity of point B. At this point a change in the connection to the biasing source and to the interphase transformer is made so that further operation begins at point D and the moments of ignition of the valves are then retarded so as to obtain the characteristic line DE. One manner of obtaining this operation is shown in Fig. 1 wherein the electric valve converting means may be assumed to operate in a normal manner as is well known by those skilled in the art, and the power output thereof is reduced to a predetermined value by adjustment of the adjustable phase-shifting means 18. This operation is obtained while both the switches 23 and 24 are closed. The operation of the electric valve converting system therefore is that of a simple six-phase rectifier. When the point B on the curve in Fig. 2 is reached the control means on the phase-shifting device 18 operates to open switches 23 and 24. Opening the switch 24 causes the rectifier operation to be changed to double three-phase operation. Such operation, however, requires that the control voltages for the control electrodes of the valves must be changed and one means comprises opening the switch 23 which introduces an auxiliary control voltage or biasing voltage in the form of a direct potential obtained from the generator 31. Further movement of the phase-shifting device then causes further reduction of the power output of the rectifier. Obviously, of course, a similar result may be obtained by causing the operation of the phase-shifting control to introduce an auxiliary periodic potential in the grid-to-cathode circuit of the valves and this may comprise a transformer which becomes effective at this point in the operation of the electric valve converting system. Still another manner of obtaining a similar result would be to provide two-phase shifting means such as 18 one of which is connected in circuit during the operation along the characteristic curve in Fig. 2 from A to B and the other of which supersedes this control and operates in the range from D to E. In any of these modifications suggested the interphase transformer 15 would be connected in at the instant B and further operation would, of course, be of the double polyphase type of operation. While two three-phase networks have been shown in the drawing, it will be apparent to those skilled in the art that each of the two networks may comprise a greater or lesser number of phases and that the operation of the electric valve converting means starts out as an n-phase rectifier and at a predetermined point this is changed to a double $$\frac{n}{2}$$

phase rectifier.

While I have shown a particular application of my invention to an electric valve converting apparatus, it is to be understood that this is merely illustrative of one of a number of electric valve converting systems to which my invention may be applied. It will, of course, be understood that I do not wish to be limited thereto since it is apparent that the principles herein disclosed are susceptible of numerous other applications and modifications may be made in the circuit arrangement to which my invention may be applied without departing from the spirit and scope of my invention as set forth in the appended claims.

What I claim as new and desire to secure by Letters Patent of the United States is:

1. In combination, an alternating current supply circuit, a direct current load circuit, an electric valve converting system interconnecting said circuits, said system including a plurality of polyphase networks, an interphase winding, and a plurality of arc discharge valves, means for controlling the circuit relation of said interphase transformer, a control circuit for said valves including a source of periodic potential, means for controlling the phase relation thereof, a source of bias potential for said valves, and control means for controlling substantially simultaneously said phase controlling means, said bias potential, and said means for controlling the circuit relation of said transformer.

2. In combination, an alternating current supply circuit, a direct current load circuit, an electric valve converting system interconnecting said circuits, said system including a plurality of polyphase networks, an interphase transformer, and a plurality of electric arc discharge valves, means for selectively short circuiting said interphase transformer, a control circuit for said valves including a source of periodic potential, means for controlling the phase relation thereof, auxiliary means for subsequently determining the effective phase relation of said periodic control potential, and control means for controlling in a predetermined manner said phase-controlling means, said short circuiting means, and said auxiliary means for subsequently determining the effective phase relation of said periodic control voltage.

3. In combination, an alternating current supply circuit, a direct current load circuit, an electric valve converting system interconnecting said circuits, said system including a plurality of polyphase networks, an interphase winding, and a plurality of electric arc discharge valves, means for short circuiting said interphase winding, a control circuit for said valves including a source of control potential, means for controlling the phase thereof, a second source of control potential, and control means for controlling in a predetermined manner said phase-controlling means, said second control potential, and said means for short circuiting said interphase winding.

4. In an electric valve converting system interconnecting alternating current and direct current circuits, the method of operation which comprises operating said system as an n-phase rectifier and progressively retarding the moments of ignition of the valves thereof to a predetermined point, then causing the system to operate as a double $$\frac{n}{2}$$

phase rectifier and simultaneously readjusting the moments of ignition of the valves of said system and then again progressively retarding the moments of ignition of said valves thereby to further reduce the power output of said electric valve rectifying system.

CARL C. HERSKIND.